United States Patent [19]
Faller et al.

[11] Patent Number: 5,855,443
[45] Date of Patent: Jan. 5, 1999

[54] BREAKAWAY CONNECTION SYSTEM FOR ROADSIDE USE

[75] Inventors: Ronald K. Faller; John D. Reid, both of Lincoln, Nebr.; Eugene W. Paulsen, Wichita, Kans.; Kenneth L. Krenk, Lincoln, Nebr.

[73] Assignee: Board of Regents of University of Nebraska, Lincoln, Nebr.

[21] Appl. No.: 857,419

[22] Filed: May 16, 1997

[51] Int. Cl.⁶ .......................................... F16D 9/06
[52] U.S. Cl. ............................ 403/2; 52/98; 248/548
[58] Field of Search ............................ 403/2, 327, 300; 248/548, 909, 900; 52/98; 285/3, 4

[56] References Cited

U.S. PATENT DOCUMENTS

| | | |
|---|---|---|
| 2,085,074 | 6/1937 | Boyles . |
| 2,282,641 | 5/1942 | Corey ...................................... 403/2 X |
| 2,305,377 | 12/1942 | Corey . |
| 3,214,886 | 11/1965 | Pechmann . |
| 3,349,531 | 10/1967 | Watson . |
| 3,381,427 | 5/1968 | Watson ........................................ 52/98 |
| 3,499,630 | 3/1970 | Dashio . |
| 3,623,286 | 11/1971 | Parduhn . |
| 3,623,394 | 11/1971 | Paine ...................................... 403/2 X |
| 3,630,474 | 12/1971 | Minor .......................................... 52/98 |
| 3,637,244 | 1/1972 | Strizki ..................................... 403/2 X |
| 3,837,752 | 9/1974 | Shewchuk .................................. 403/2 |
| 4,479,666 | 10/1984 | Welsh et al. ................................ 285/4 |
| 4,638,608 | 1/1987 | Coy . |
| 4,858,876 | 8/1989 | Moreno ................................. 248/548 X |
| 4,923,319 | 5/1990 | Dent .............................................. 403/2 |
| 4,926,592 | 5/1990 | Nehls . |
| 5,060,436 | 10/1991 | Delgado, Jr. . |
| 5,125,194 | 6/1992 | Granger . |
| 5,596,845 | 1/1997 | Strizki ......................................... 52/98 |

FOREIGN PATENT DOCUMENTS 2725057  12/1978  Germany ................................... 52/98

*Primary Examiner*—Harry C. Kim
*Attorney, Agent, or Firm*—Shock, Hardy & Bacon L.L.P.

[57] ABSTRACT

A breakaway mounting system for mounting a structure to a fixed support surface has a plurality of elongated mounting members extending generally perpendicular to the support surface. An attachment plate is coupled with the structure to be mounted. The attachment plate has a plurality of apertures formed therein, and each of the mounting members extends through one of the apertures. A plurality of shearing plates are provided. Each shearing plate generally surrounds one of the mounting members and is positioned between the support surface and the attachment plate. Each shearing plate has an upper surface and a lower surface. The area of the shearing plate upper surface is substantially smaller than the area of a lower surface of the attachment plate, and the area of the shearing plate lower surface is substantially smaller than the area of the support surface. A fastener is attached to the mounting member for securing the attachment plate to the support surface. One of the upper surface and the lower surface of each shearing plate forms a shear plane for shearing the associated mounting member when the structure is impacted by a vehicle with sufficient force.

21 Claims, 2 Drawing Sheets

BREAKAWAY CONNECTION SYSTEM FOR ROADSIDE USE

BACKGROUND OF THE INVENTION

This invention relates to a system for connecting a roadside structure, such as a highway sign, to a support surface, and in particular to a system that allows the structure to be broken away upon being impacted by an errant vehicle.

Roadways and highways have numerous necessary structures located along their sides. For instance, almost every single highway has highway sign posts, commercial sign posts, luminaire supports, emergency call box supports, and fire hydrants located therealong. It is necessary for these structures to be located in close proximity to the road. These structures present significant hazards to an errant vehicle that exits the roadway and impacts the structures. If the structures are rigidly fixed adjacent the roadside, contact by a vehicle with the structure will result in significant damage to the vehicle and potentially serious bodily harm to the vehicle occupants. In fact, if such structures are rigidly secured, the chance of a fatality occurring in a collision dramatically increases. More specifically, a moving vehicle contacting a fixed, rigid support is subject to significant deceleration and generates an incredible amount of force that results in a very violent collision. A roadside structure that will breakaway or yield upon impact by a vehicle will greatly reduce the severity of the collision and is less likely to result in bodily harm to the vehicle occupants.

Numerous attempts have been made in the past to provide connections between roadside structures and a ground support surface. Once of the most basic types of prior art structures involves the use of yielding supports. More specifically, a structure, such as a sign, is supported by a yielding rod-like structure. When a vehicle impacts the rod-like structure, the rod simply bends over and out of the way of the impacting vehicle. These types of yielding support structures are typically only suitable for small highway structures. More particularly, in order to support large highway structures, a support rod or the like must have a particular rigidity to hold the structure in the upright position, especially when the structure is subjected to wind loading. Oftentimes, the rigidity of the material utilized to support the large structure is such that if contacted by a vehicle, a significant amount of force is still generated, thus resulting in a violent collision. Additionally, as is apparent, in order to adopt existing roadside structures to utilize yieldable supports, it is necessary to re-anchor the support in the ground utilizing the yielding support structure.

A further type of highway structure connection is a slip-base connection. In this type of connection, an anchor member extends from the ground and has a rigid plate secured thereto. The support member used to support the structure also has end plate that rests on the anchor member end plate. Notches are provided on the edges of the end plates of the adjoining anchor member and support member. Bolts are placed in these edge notches to connect the two end plates together and, thus, to connect the support member to the anchor member. The edge notches are such that they allow the bolts to slip out of the connection when the structure is contacted by a vehicle. A keeper plate is commonly used to hold the bolts and prevent the bolts from slipping out of the edge notches due to wind induced vibration and temperature-induced expansion and contraction. These types of structures suffer from the disadvantage that they are oftentimes not omnidirectional. More specifically, if a vehicle contacts the supported structure in a force line that is not in line with the edge notches, a substantial amount of force can still be generated by a collision. Further, it is typically difficult to adopt existing roadside structures to the slip base devices. Additionally, the clamping force must be between specific ranges to allow the bolts to slip, but still resist wind loads and temperature variations. Therefore, during installation, the torquing of the bolts to obtain the correct clamping force is crucial, thus requiring substantial time and attention to detail during preparation.

A still further type of roadside connector is a frangible transformer base. A frangible transformer base consists of a pedestal that is manufactured from a brittle material, typically aluminum. The frangible base is used to support the highway structure and attaches the support member to a rigid base, such as a concrete foundation. When a vehicle impacts the highway structure, the frangible transformer base fractures, allowing the supporting member to breakaway from the rigid base and move out of the way of the errant vehicle. As is apparent, it is oftentimes difficult to modify existing structures to use frangible transformer bases. Still further, frangible transformer bases are typically expensive to manufacture and can require numerous different sizes be made for different sizes of structure.

A still further type of roadside connector is frangible couplers. These couplers are often placed between a plate attached to an anchor member and a plate attached to a support member. When the highway support structure is impacted, the frangible couplers fracture and allow the support and anchor members to separate, thus reducing the potential for injury to the vehicle occupants. The first type of frangible coupler consists of a generally cylindrically fabricated body formed of a brittle matrix material. On one end of the cylinder a short threaded rod is cast into the brittle matrix material and presents male threads for connection to the attachment plate of a support member. The other end of the cylinder has a threaded sleeve formed therein that presents a female thread surface that is capable of mating with a male-threaded stud of an anchor member. A second type of frangible coupler consists of a solid shaft that is machined with threads on each end and with an hourglass configuration in the middle region between the threaded ends. The hourglass-shaped middle region presents a reduced cross section for fracturing upon contact. Frangible couplers are typically expensive and difficult to manufacture because they require the machining of special features, such as an hourglass configuration, that result in high labor and machine costs. Additionally, because of the difficulty of manufacturing frangible connectors, it is oftentimes difficult to adopt existing highway structures for their use. More specifically, an existing highway structure has a particular weight and height that results in certain wind load and gravitational forces being applied to the base of the support structure. Therefore, existing off-the-shelf frangible couplers oftentimes lack a sufficient number of sizes and types to retrofit a great number of existing supports. In particular, the sizes available may not provide sufficient resistance to wind loading while allowing sufficient breakaway capacity to reduce injury due to collision. If this is the case, it may be necessary to custom manufacture the frangible coupler which results in very high manufacturing costs due to the potential intricate molding and milling processes required to make these couplers.

Therefore, a breakaway connection system is needed which will overcome the problems with the prior connecting structures discussed above.

SUMMARY OF THE INVENTION

Accordingly, it is an object of the present invention to provide a breakaway connection system for connecting a roadside structure that is omnidirectional so that the structure will breakaway from an anchor member irregardless of the direction from which the structure may be impacted by a vehicle.

Another object of this invention is to provide a breakaway connection system that can be easily adopted to existing roadside structures without substantial modification or expense.

A still further object of this invention is to provide a breakaway connection system that can be easily manufactured to provide numerous different sizes and configurations to be adopted to a multitude of mounting situations.

Accordingly, the present invention provides a breakaway mounting system for mounting a structure to a fixed support surface. A plurality of elongated mounting members extend generally perpendicular to the support surface. An attachment plate is coupled with the structure to be mounted. The attachment plate has a plurality of apertures formed therein. Each of the mounting members extends through one of the apertures. A plurality of shearing plates are provided. Each shearing plate generally surrounds one of the mounting members and is positioned between the support surface and the attachment plate. Each of the shearing plates has an upper surface and a lower surface. The area of the shearing plate upper surface is significantly smaller than the lower surface area of the attachment plate, and the area of the shearing plate lower surface is significantly smaller than the area of the support surface. A fastener is attached to the mounting member for securing the attachment plate to the support surface. One of the shearing plate upper surface and the shearing plate lower surface forms a shear plane for shearing the associated mounting member when the structure is contacted by a vehicle with sufficient force.

BRIEF DESCRIPTION OF THE DRAWINGS

In the accompanying drawings which form a part of this specification and are to be read in conjunction therewith, and in which like reference numerals are used to indicate like parts in the various views.

DETAILED DESCRIPTION OF THE PREFERRED EMBODIMENTS

Figure 1:
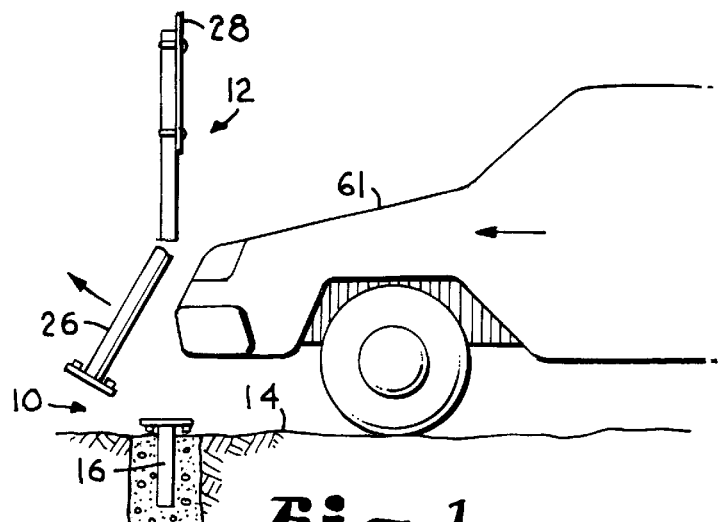
FIG. 1 is a diagrammatic view showing a signpost structure having a breakaway mounting system according to the present invention with a vehicle engaging the signpost and the breakaway action having already taken place.

Referring to the drawings in greater detail, and initially to FIGS. 1–5, a breakaway mounting system designated generally by the numeral 10 is shown. System 10 is utilized to mount a structure 12 such as a sign post or luminare support to a ground surface 14. Typically, ground surface 14 is located adjacent a roadway such that the possibility of structure 12 being hit by an errant vehicle is substantial. An anchor member 16 is fixedly mounted in ground surface 14 via any well-known means, such as cementing anchor 16 into a bore drilled or dug into surface 14. Positioned atop anchor 16 and fixedly secured thereto is a generally horizontally disposed anchor plate 18. Anchor plate 18 has a plurality of through apertures 20 formed therein. Apertures 20 will generally vary from two to four in number, depending on the size of the structure 12 needed to be supported, as will be further discussed below. In the embodiment shown in FIGS. 2 and 3, three apertures 20 are shown arranged in a generally triangular pattern. Additionally, anchor plate 18 is generally shown as having a circular shape with an upper support surface 22, although other shapes are possible. For instance, plate 18 can have a square or rectangular shape which would make it somewhat easier to manufacture.

Positioned above and spaced from anchor plate 18 by system 10 is generally horizontally disposed support attachment plate 24. The upper surface of plate 24 has a support member 26 rigidly secured thereto. Support member 26 serves to support a structure such as a sign 28 above surface 14. Plate 24 also has a plurality of through apertures 30 formed therein. Again, apertures 30 are preferably two to four in number and generally aligned with apertures 20 in anchor plate 18. As with anchor plate 18, attachment plate 24 is also generally circular in shape and apertures 30 are also in a triangular configuration spaced about support member 26. Again, other plates, shapes and aperture configurations are possible. In particular, plate 24 can be square or rectangular to reduce the manufacturing costs.

Figure 4:
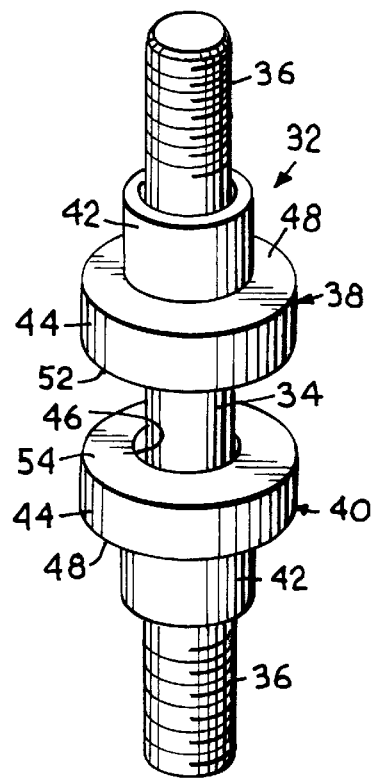
FIG. 4 is an exploded perspective view of a breakaway unit used in the mounting system of FIG. 1.

System 10 used to attach anchor plate 18 to attachment plate 24 is comprised of a plurality of breakaway units 32. With reference to FIG. 4, each unit 32 includes a connecting rod 34 with a male thread surface 36 on each end, an upper shearing plate 38, and a lower shearing plate 40. Rod 34 could also be threaded along its entire extent. Shearing plates 38 and 40 are identical in construction and are generally comprised of a step washer having a first generally cylindrical portion 42 with a diameter $D_{S1}$ and a second generally cylindrical portion 44 with a diameter $D_{S2}$. Diameter $D_{S2}$ is greater than diameter $D_{S1}$ to form the step portion of the washer. Each plate 38 and 40 also has a centrally aligned bore 46 which is capable of receiving rod 34.

Figure 2:
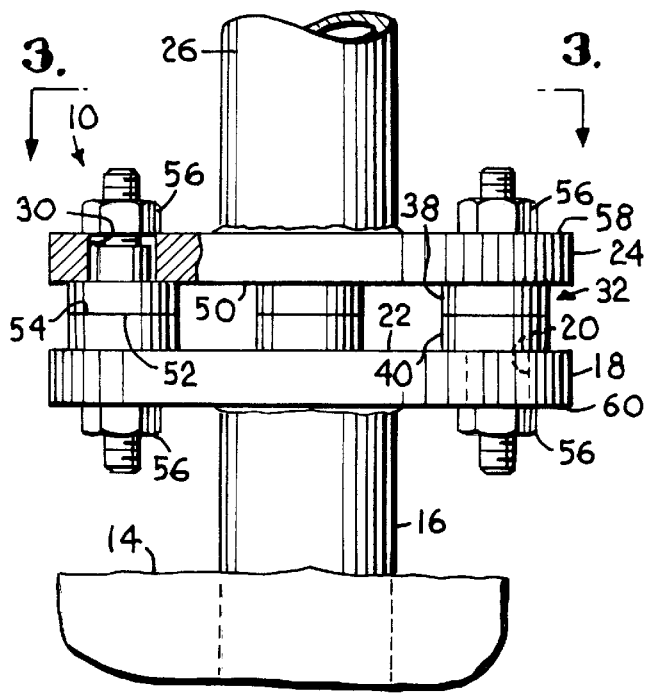
FIG. 2 is an enlarged fragmentary side elevational view of the mounting system shown in FIG. 1 prior to the breakaway action, parts broken away and shown in cross section to reveal details of construction.
Figure 3:
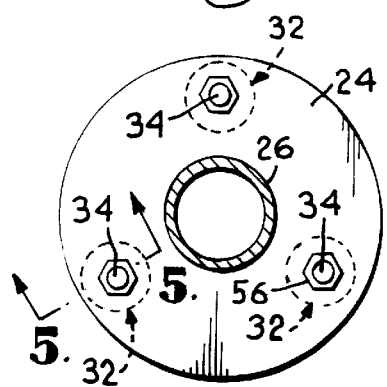
FIG. 3 is a cross-sectional view taken generally along lines 3—3 of FIG. 2, hidden shearing plates shown in broken lines.
Figure 5:
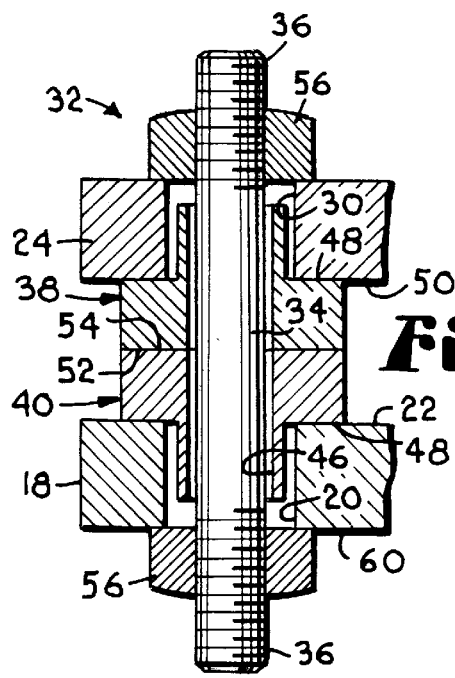
FIG. 5 is a cross-sectional view taken generally along lines 5—5 of FIG. 3.
Figure 6:
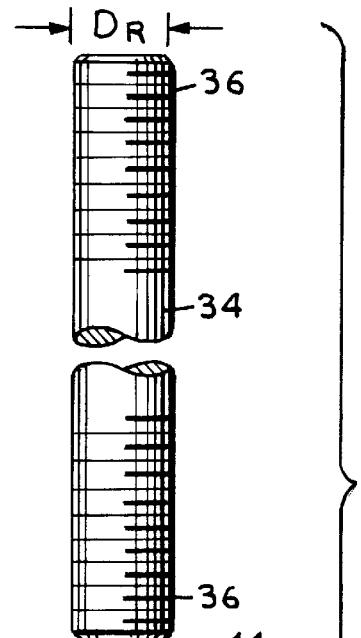
FIG. 6 is a side elevational view of a mounting rod and a shearing plate according to the present invention.

With reference to FIGS. 2 and 5, each unit 32 is assembled to connect attachment plate 24 and anchor plate 18 by first positioning upper shear plate 38 such that its first portion 42 is received in one of the apertures 30 formed in attachment plate 24 and such that an upper annular surface 48 of its second portion 44 is in contact with a lower surface 50 of attachment plate 24. Lower shearing plate 40 is positioned such that its first portion 42 is received in an associated aperture 20 of anchor plate 18 and such that the annular surface 48 of its second portion 44 rests on support surface 22. An annular shearing surface 52 of upper shearing plate 38 contacts an annular shearing surface 54 of lower shearing plate 40. Surfaces 52 and 54 form a shearing plane, as will be further discussed below. A rod 34 is then received through the aligned bores 46 of shearing plates 38 and 40. As is apparent, apertures 20 and 30 are of a diameter larger than the diameter $D_r$ of rod 34 such that the first portion 42 of each shearing plate 38 and 40 can also be accommodated in the aperture. Nuts 56 are threaded on male thread surfaces 36 adjacent an upper surface 58 of attachment plate 24 and adjacent a lower surface 60 of anchor plate 18. Nuts 56 are tightened on thread surfaces 36 such that shearing plates 38 and 40 are sandwiched together between anchor plate 18 and attachment plate 24. A breakaway unit 32 is assembled for each of the aligned apertures of plates 18 and 24. In the embodiment shown in FIGS. 2, 3 and 5, three such units 32 are assembled.

Breakaway system 10 operates in response to a vehicle 61 hitting structure 12 as indicated in FIG. 1. As vehicle 61 contacts structure 12, tremendous horizontal and moment forces will be applied at the connection between support 26 and anchor 16. These forces will result in the separation between anchor plate 18 and attachment plate 24. More specifically, because of moment forces applied to structure 12, the rod 34 associated with the unit 32 located closest to the point of impact of the vehicle likely will fail and break apart due at least in part to tensile forces applied thereto. Additionally, because of the significant horizontal forces being applied to structure 12, a shearing plane is created between surfaces 52 and 54 of paired shearing plates 38 and 40. More specifically, because upper shearing plate 38 is coupled to attachment plate 24 via its first portion 42 being disposed in associated aperture 30, horizontal force applied to structure 12 will also be conveyed to upper shearing plate 38. Further, lower shearing plate 40 is fixedly coupled to anchor plate 18 in a similar manner. Therefore, a shearing plane is created between surfaces 52 and 54 which will essentially snap rod 34 into two pieces. As discussed above, in the units 32 closest to the point of impact, a combination of tensile and shear stresses will cause the rods 34 to fail. However, in the units 32 furthest away from the point of impact, essentially shearing stresses will cause the associated rods 34 to fail. As all the rods 34 of the units 32 fail, structure 12 will be separated from anchor 16, thus resulting in less force transmission being conveyed to the vehicle upon impact, and thus reducing the likelihood of injury to the occupants of the vehicle. The actual amount of tension forces which will cause failure versus the shearing forces that will cause failure is also a factor of the level at which structure 12 is impacted. More specifically, if structure 12 is impacted fairly close to breakaway system 10, shearing forces are more likely to be prevalent in the separation between the structure and the anchor. However, if impact is further up on structure 12, it is more likely that significant moment forces will be applied to system 12 and at least some of rods 34 will fail at least partly due to tensile stresses.

The type of sign (dual support or single support) may also affect whether mainly shear or moment forces are present. In particular, if a dual support is used and only one support is impacted by a vehicle, it is more likely only shear forces will cause separation. With dual support signs, as one support is hit, the top of that support remains relatively fixed because the other noncontacted support is still intact and supports the sign. Therefore, the top of the impacted support cannot rotate away from the impact resulting in primarily shearing forces causing failure of rods 34.

Breakaway system 10 is also omnidirectional. That is, structure 12 will breakaway from anchor 16 no matter the direction from which structure 12 is impacted. In other words, because of the nature of shearing plates 38 and 40, a shearing plane will be formed between them no matter the direction of force applied to structure 12.

With reference to FIG. 2, the surface area of shearing surface 52 is significantly smaller than the surface area of attachment plate lower surface 50, and the surface area of shearing surface 54 is significantly smaller than the surface area of support surface 22. Because it is only surfaces 52 and 54 that are in contact with one another, there are greatly reduced friction forces between support 26 and anchor 16. This reduction in engaged surfaces reduces the amount of horizontal force required to shear rods 34, thus aiding and resulting in the breakaway function of system 10.

Although the above embodiment is described as utilizing three breakaway units 32, it is contemplated that any plurality of breakaway units could be used and, particularly, that two to four breakaway units for each support member 26 are preferable. More specifically, it is contemplated that system 10 can be utilized with small, medium and large structures. In particular, small structures typically will have only a single support member 26 and will utilize two to three breakaway units 32. An example of a small structure would be a stop sign or the like. Medium structures generally can have one to two support members 26 with two to three breakaway units associated with each support. An example of a medium support could be a highway sign that requires laterally spaced supports to provide a medium sized surface to convey information. Large structures typically will utilize two to three supports members 26 with each of the support members having two to four breakaway units 32. Large structures are typically extremely large highway signs that provide a surface large enough to convey a substantial amount of information.

The table set forth below gives preferred dimensions for breakaway units 32, depending upon the type of structure to be supported. In the table, the $D_R$ represents the diameter of rod 34; $D_{hole}$ represents the diameter of bore 46; $D_{S1}$ represents the diameter of the first portion of shearing plates 38 and 40; $D_{S2}$ represents the diameter of the second portion of shearing plates 38 and 40; $L_{S1}$ represents the thickness of the first portion of shearing plates 38 and 40; and $L_{S2}$ represents the thickness of the second portion of shearing plates 38 and 40.

| Configuration | DR | $D_{hole}$ | $D_{S1}$ | $D_{S2}$ | $L_{S1}$ | $L_{S2}$ |
|---|---|---|---|---|---|---|
| Small Structures | 1/4"φ | 0.28" − 0.01" | 0.4" + 0.01" | 0.9" + 0.01" | 0.15" + 0.01" | 0.125" + 0.01" |
| (Single Supports) | 5/16"φ | 0.35" − 0.01" | 0.5" + 0.01" | 1.0" + 0.01" | 0.15" + 0.01" | 0.125" + 0.01" |
| (2 to 3 rods per support) | 3/8"φ | 0.41" − 0.01" | 0.6" + 0.01" | 1.1" + 0.01" | 0.20" + 0.01" | 0.15" + 0.01" |
| Medium Structures | 5/16"φ | 0.35" − 0.01" | 0.5" + 0.01" | 1.0" + 0.01" | 0.15" + 0.01" | 0.125" + 0.01" |
| (Single/Dual Supports) | 3/8"φ | 0.41" − 0.01" | 0.6" + 0.01" | 1.1" + 0.01" | 0.20" + 0.01" | 0.15" + 0.01" |
| (2 to 3 rods per support) | 7/16"φ | 0.47" − 0.01" | 0.7" + 0.01" | 1.3" + 0.01" | 0.25" + 0.01" | 0.20" + 0.01" |
| | 1/2"φ | 0.54" − 0.01" | 0.8" + 0.01" | 1.5" + 0.01" | 0.30" + 0.01" | 0.25" + 0.01" |
| Large Structures | 3/8"φ | 0.41" − 0.01" | 0.6" + 0.01" | 1.1" + 0.01" | 0.20" + 0.01" | 0.15" + 0.01" |
| (Dual/Triple Supports) | 7/16"φ | 0.47" − 0.01" | 0.7" + 0.01" | 1.3" + 0.01" | 0.25" + 0.01" | 0.20" + 0.01" |
| (2 to 4 rods per support) | 1/2"φ | 0.54" − 0.01" | 0.8" + 0.01" | 1.5" + 0.01" | 0.30" + 0.01" | 0.25" + 0.01" |
| | 9/16"φ | 0.60" − 0.01" | 0.9" + 0.01" | 1.7" + 0.01" | 0.35" + 0.01" | 0.30" + 0.01" |
| | 5/8"φ | 0.66" − 0.01" | 1.0" + 0.01" | 1.9" + 0.01" | 0.40" + 0.01" | 0.35" + 0.01" |

-continued

| Configuration | DR | $D_{hole}$ | $D_{S1}$ | $D_{S2}$ | $L_{S1}$ | $L_{S2}$ |
|---|---|---|---|---|---|---|
| | $^{11}\!/_{16}"\phi$ | 0.72" − 0.01" | 1.1" + 0.01" | 2.1" + 0.01" | 0.45" + 0.01" | 0.40" + 0.01" |
| | $^{3}\!/_{4}"\phi$ | 0.79" − 0.01" | 1.2" + 0.01" | 2.3" + 0.01" | 0.50" + 0.01" | 0.45" + 0.01" |

It has been found that the invention operates adequately when the ratio of $D_{S2}$ to $D_R$ is approximately in the range of 2.5:1 to 4:1. It has further been found that it is preferable for the $D_{S2}$:$D_R$ ratio to be in the range of 2.9:1 to 3.6:1, with the most preferred ratio being approximately 3:1. Still further, it has been found that the breakaway system operates adequately when the ratio of $D_R$ to $L_{S2}$ is in the range of 1.5:1 to 3:1. Additionally, the $D_R$:$L_{S2}$ ratio is preferably in the range of 1.7:1 to 2.5:1, with the most preferred value being approximately 2:1. Still further, it has been found that shearing plates operate adequately if constructed with the ratio of $L_{S2}$ to $L_{S1}$ in the range of 0.7:1 to 0.95:1. Preferably, the $L_{S2}$:$L_{S1}$ ratio is in the range of 0.75:1 to 0.9:1 with a most preferred value of 0.82:1. Still further, it has been found that shearing plates 38 and 40 will operate adequately if the ratio of $D_{S2}$ to $D_{S1}$ is in the range of 1.5:1 to 2.5:1. Additionally, the $D_{S2}$:$D_{S1}$ ratio is preferably in the range of 1.83:1 to 2.25:1, with a most preferred value of 1.9:1.

Rods 34 are preferably made of a brittle material, for instance, a hardened corrosion resistant stainless steel having a yield strength of 500 MPa and an elongation of 20 percent. Shearing plates 38 and 40 are also preferably made of a hardened corrosion resistant stainless steel. Rods 34 and plates 38 and 40 could also be made of any other suitable material, for instance, galvanized steel.

As is apparent, rods 34 and shearing plates 38 and 40 can be easily manufactured, and, in fact, can sometimes be off-the-shelf items. These structures do not require special machining of special materials by skilled laborers, as is often the case with prior art breakaway connectors. Rods 34 and shearing plates 38 and 40 can often be assembled by cutting and welding stock materials. Additionally, because shearing plates 38 and 40 can be manufactured with first portion 42 to fit existing sized apertures 20 and 30, existing roadside structures with existing expensive breakaway connectors can be easily modified to utilize units 32. Although rods 34 are shown with a generally circular cross section, other cross sections such as square or elliptical shapes may adequately function to provide a breakaway feature. Additionally, although shearing plates 38 and 40 are also generally shown having a circular cross section, these plates also may have a square rectangular or other suitable shape. As is apparent, shearing plates 38 and 40 can be formed without first sections 42 so long as they are adequately secured to their respective plates 24 and 18. For instance, upper shearing plate 38 could be secured to attachment plate 24 via welding and lower shearing plate 40 could be attached to anchor plate 18 via welding.

Figure 7:
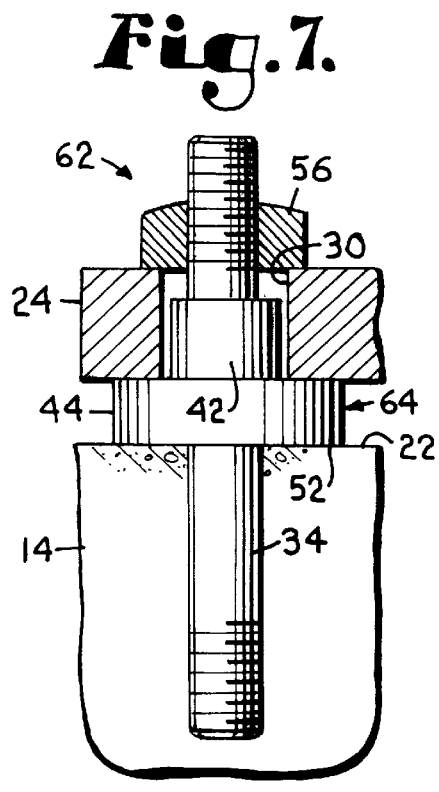
FIG. 7 is an alternative embodiment of the present invention.

With reference to FIG. 7, an alternative breakaway unit 62 is shown. Unit 62 can be utilized when there is no anchor member 16 extending from a ground surface 14, but instead, a rod 34 is embedded in ground surface 14. Rod 34 could be cast in place if surface 14 is a concrete surface and, further, can have an L-shape configuration below the surface. Therefore, ground surface 14 offers the support surface 22 above which attachment plate 24 is spaced. Unit 62 utilizes only one shearing plate 64 which is oriented identically to upper shearing plate 38. In other words, first portion 42 of shearing plate 64 is received in an aperture 30 of attachment plate 24 such that horizontal movement of plate 24 will result in horizontal movement of shearing plate 64. Shearing surface 52 of shearing plate 64 rests upon support surface 22 and forms a shearing plane therebetween. Therefore, as a vehicle contacts structure 12, the horizontal movement of attachment plate 24 will result in the shearing of rod 34 along the shearing plane formed between shearing surface 52 and support surface 22.

Figure 8:
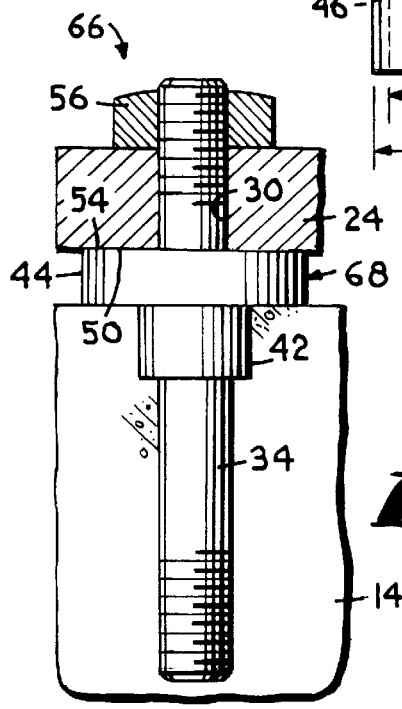
FIG. 8 is a further alternative embodiment of the present invention.

A still further alternative breakaway unit 66 is shown in FIG. 8. Again, in breakaway unit 66, a rod 34 is embedded in ground surface 14. Still further, a first portion 42 of a shearing plate 68 is also embedded in ground surface 14, such that shearing plate 68 is generally coupled thereto. Shearing plate 68 is oriented in the same manner as lower shearing plate 40 of the first embodiment. Rod 34 extends through an aperture 30 in attachment plate 24. Shearing surface 54 of shearing plate 68 contacts lower surface 50 of attachment plate 24 and forms a shear plane therebetween. Therefore, as a vehicle contacts structure 12, attachment plate 24 is moved horizontally and rod 34 is sheared along the plane formed between surface 50 and surface 54.

From the foregoing, it will be seen that this invention is one well-adapted to obtain all of the ends and objects hereinabove set forth.

It will be understood that certain features and subcombinations are of utility and may be employed without reference to other features in subcombinations. This is contemplated by and is within the scope of the claims.

Since many possible embodiments may be made of the invention without departing from the scope thereof, it is to be understood that all the matters herein set forth are to be interpreted as illustrative and not in a limiting sense.

We claim:
1. A breakaway structure comprising:
a fixed support surface;
an attachment plate having a plurality of apertures formed therein;
a plurality of elongated mounting members extending generally perpendicular to the support surface, each said mounting member extending through one of said apertures;
a plurality of shearing plates, each said shearing plate generally surrounding one of said mounting members and positioned between the support surface and the attachment plate, each said shearing plate having an upper surface and a lower surface, the area of said shearing plate upper surface being smaller than the area of a lower surface of the attachment plate, and the area of said shearing plate lower surface being smaller than the area of the fixed support surface; and
a fastener attached to said mounting member for securing the attachment plate to the support surface;
wherein one of said shearing plates is coupled to one of the attachment plate and support surface; and
wherein one of said upper surface and said lower surface of each said shearing plate forms a shear plane for shearing the associated mounting member when the structure is impacted by a vehicle with sufficient force.

2. The structure of claim 1 wherein at least one of said shearing plates is coupled to the attachment plate so that generally horizontal movement of the attachment plate results in horizontal movement of said shearing plate and such that said shearing plane is formed along said lower surface of said shearing plate.

3. The structure of claim 1 wherein at least one of said shearing plates is coupled to the support surface so that generally horizontal movement of the attachment plate results in minimal horizontal movement of said shearing plate and such that said shearing plane is formed along the upper surface of said shearing plate.

4. The structure of claim 1 wherein each of said mounting members has two shearing plates generally surrounding it and stacked one above the other, wherein said upper shearing plate is coupled to the attachment plate such that horizontal movement of the attachment plate results in horizontal movement of said upper shearing plate and wherein the lower shearing plate is coupled to the support surface such that horizontal movement of the attachment plate results in minimal horizontal movement of said lower shearing plate, and wherein said shearing plane is created between said lower surface of said upper shearing plate and said upper surface of said lower shearing plate.

5. The structure of claim 1 wherein at least one of said mounting members is a rod with a generally circular cross section.

6. The structure of claim 1 wherein at least one of said shearing plates has a generally circular horizontal cross section and said mounting member has a generally circular horizontal cross section.

7. The structure of claim 6 wherein said shearing plate has a large external diameter section and small external diameter section, said small diameter section coupled with one of the attachment plate and the support surface.

8. The structure of claim 7 wherein said small external diameter section is positioned in one of the attachment plate apertures so that said shearing plate moves horizontally with the attachment plate.

9. The structure of claim 6 wherein the ratio of the diameter of the shearing plate to the diameter of the mounting member is in the range of 2.5:1 to 4:1.

10. The structure of claim 6 wherein the ratio of the diameter of the shearing plate to the diameter of the mounting member is in the range of 2.9:1 to 3.6:1.

11. The structure of claim 6 wherein the ratio of the diameter of the shearing plate to the diameter of the mounting member is approximately 3:1.

12. The structure of claim 1 wherein the ratio of a diameter of said mounting member to the thickness of said shearing plate is in the range of 1.5:1 to 3:1.

13. The structure of claim 1 wherein the ratio of a diameter of said mounting member to the thickness of said shearing plate is in the range of 1.8:1 to 2.5:1.

14. The structure of claim 1 wherein the ratio of a diameter of said mounting member to the thickness of said shearing plate is approximately 2:1.

15. The structure of claim 1 wherein the support surface is presented by a mounting plate which is fixed to the top of a ground anchor member.

16. A breakaway structure comprising:

a fixed support surface, the structure an attachment plate having a plurality of apertures;

a plurality of elongated rods extending generally perpendicular to the support surface, each said rod extending through one of said apertures;

a plurality of generally cylindrical shearing plates disposed in pairs such that there is an upper shearing plate and a lower shearing plate associated with each of said rods and such that each pair is positioned between the support surface and the attachment plate, said shearing plates have a large diameter section and small diameter section, each said shearing plate of a pair generally surrounding its associated mounting member, said upper shearing plate positioned so that said small diameter section of said upper shearing plate is coupled with the attachment plate such that horizontal movement of the attachment plate results in horizontal movement of said upper shearing plate and said lower shearing plate positioned so that said small diameter section of said lower shearing plate is coupled with the support surface such that horizontal movement of the attachment plate results in minimal horizontal movement of said lower shearing plate, and wherein a shearing plane is created between a lower surface of said upper shearing plate and an upper surface of said lower shearing plate; and a fastener attached to said mounting member for securing said attachment plate to the support surface.

17. A breakaway structure comprising:

a fixed support surface;

an attachment plate having a plurality of apertures;

a plurality of mounting rods extending generally perpendicular to the support surface, each said mounting rod extending through one of said apertures;

a plurality of generally cylindrical shearing plates disposed in pairs such that there is an upper shearing plate and a lower shearing plate associated with each of said rods and positioned between the support surface and the attachment plate, each said shearing plate of a pair having a bore therein into which the associated rod is received, each shearing plate also having a large diameter section and a small diameter section, said upper shearing plates positioned so that said small diameter sections are received in associated apertures of the attachment plate such that horizontal movement of the attachment plate results in horizontal movement of said upper shearing plate, and said lower shearing plates positioned so that said small diameter sections are coupled with the support surface, and wherein a shearing plane is created between said lower surface of said upper shearing plate and said upper surface of said lower shearing plate such that the associated mounting rods are sheared when the structure is contacted with sufficient force by a vehicle; and a fastener attached to said mounting rod for securing said attachment plate to the support surface.

18. A breakaway structure comprising:

a fixed support surface having a plurality of apertures;

an attachment plate having a plurality of apertures formed therein;

a plurality of elongated mounting members extending generally perpendicular to the support surface, each said mounting member extending through one of said apertures;

a plurality of shearing plates, each said shearing plate generally surrounding one of said mounting members and positioned between the support surface and the attachment plate, each said shearing plate having a first surface and a second surface, the area of said shearing plate first surface being smaller than the area of said second surface, the area of said first surface being smaller than the area of at least one of said apertures formed in one of the support surface and the attachment plate to facilitate insertion thereof; and a fastener attached to said mounting member for securing the attachment plate to the support surface;

wherein said second surface of each said shearing plate forms a shear plane for shearing the associated mounting member when the structure is impacted by a vehicle with sufficient force.

19. The structure of claim 18 wherein at least one of said shearing plates is coupled to the attachment plate by the insertion of said first surface of said shearing plate into one of said attachment plate apertures so that generally horizontal movement of the attachment plate results in horizontal movement of said inserted shearing plate and such that said shearing plane is formed along said second surface of said inserted shearing plate.

20. The structure of claim 18 wherein at least one of said shearing plates is coupled to the support surface by insertion of said first surface of said shearing plate into one of said support surface apertures so that generally horizontal movement of the attachment plate results in minimal horizontal movement of said inserted shearing plate and such that said shearing plane is formed along the second surface of said inserted shearing plate.

21. The structure of claim 18 wherein each of said mounting members has two said shearing plates generally surrounding said mounting member, and each said shearing plate stacked one above the other, said upper shearing plate being coupled to the attachment plate such that horizontal movement of the attachment plate results in horizontal movement of said upper shearing plate and the lower shearing plate being coupled to the support surface such that horizontal movement of the attachment plate results in minimal horizontal movement of said lower shearing plate, and wherein said shearing plane is created between each of said second surface of each of said upper and lower shearing plates.

\* \* \* \* \*